Aug. 9, 1938.  A. R. THOMPSON ET AL  2,126,425
FEEDER FOR GRANULAR MATERIAL
Filed Sept. 18, 1936  3 Sheets-Sheet 3

INVENTORS.
Albert R. Thompson.
Charles E. Kerr.
BY Philip A. Minnis
ATTORNEY.

Patented Aug. 9, 1938

2,126,425

UNITED STATES PATENT OFFICE 2,126,425

FEEDER FOR GRANULAR MATERIAL

Albert R. Thompson, Los Gatos, Calif., and Charles E. Kerr, Hoopeston, Ill., assignors to Food Machinery Corporation, San Jose, Calif., a corporation of Delaware Application September 18, 1936, Serial No. 101,478

16 Claims. (Cl. 221—106)

The present invention relates to the handling of granular material such as green peas or similar tender material, and is more particularly concerned with the provision of a new and improved machine for measuring and feeding such material for canning purposes.

Devices of the character referred to are commonly employed in canneries to deliver measured charges of peas to bucket elevators or the like, and ordinarily embody a rotary measuring device provided with a series of measuring pockets or the like which are passed through a hopper to receive successive measured charges of material therefrom for transfer into the conveyor buckets. Difficulty has been experienced, however, in the operation of such devices due to the fact that at the various cutoff points, crushing of the tender material frequently occurs, so that the quality of the material is impaired and it is not graded as highly for sales purposes. Moreover, since this tendency to crush the peas increases with the speed of the machine, their speed, and consequently their capacity, is limited.

The present invention contemplates the provision of a material handling machine having a novel mode of operation by means of which successive charges of tender material such as green peas and the like can be measured and transferred to a container not only without crushing, but also more rapidly than heretofore, so that the handling process does not impair the quality of the peas in any respect, and at the same time a greater capacity is afforded.

It is the general object of the invention, therefore, to provide an improved machine for handling granular material by which measured charges of such material may be transferred from a source of supply to a suitable point of delivery.

Another object of the invention is to provide an improved machine of the character referred to which is of large capacity and capable of handling tender material such as green peas and the like without injury thereto.

Another object of the invention is to provide a machine of the character described in which injury to the material is prevented during handling of measured charges thereof by enlargement of the measuring pocket after measuring of the charge to be carried thereby.

Other objects will appear as the description progresses with reference to preferred embodiments illustrated in the accompanying drawings.

For descriptive purposes, the invention is disclosed as embodied in the type of machine commonly used for elevating measured charges of green peas and the like from a source of supply to various processing and canning devices such as graders and the like, such machine including, generally, an endless series of containers in the form of open buckets which are moved successively past a measuring and transfer device to receive therefrom measured charges of material from a source of supply for transfer to another point. The type of machine shown is merely illustrative and, obviously, the invention can be embodied in machines for effecting direct filling of cans and the like where it is desired to deposit a measured amount of material in each can without injury to the material.

Figure 1:
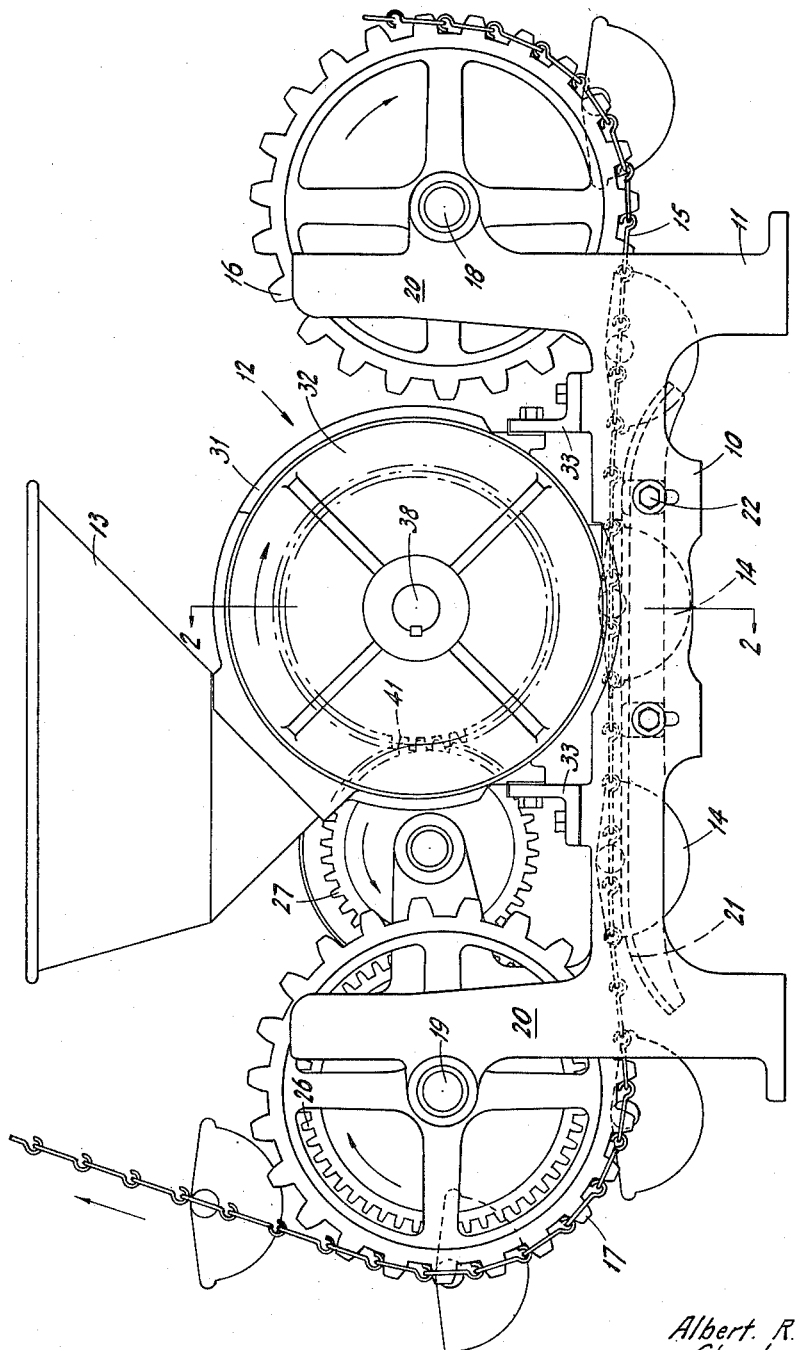
Fig. 1 is a side elevation of a machine embodying the invention.
Figure 2:
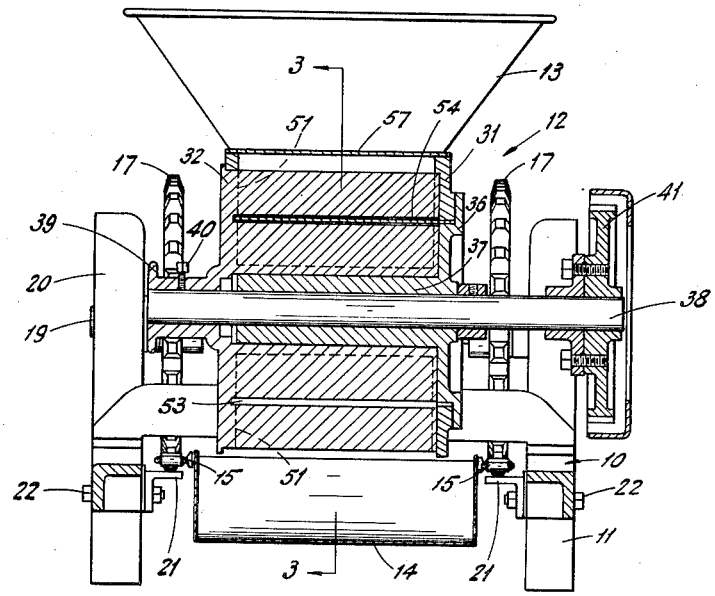
Fig. 2 is a vertical transverse section through the machine taken in the plane of the line 2—2 in Fig. 1.

Referring to Figs. 1 and 2, the machine includes frame 10 supported by legs 11, and providing a mounting for rotary measuring and transfer means 12 and hopper 13. As described hereinafter, measuring and transfer means 12 is effective to receive measured charges of material from hopper 13 and deposit such charges successively in containers or buckets 14 of conventional construction carried between spaced apart chains 15. Chains 15 are entrained with idler sprockets 16 and driving sprockets 17 which are carried by respective shafts 18, 19 journalled in upright bracket portions 20 of frame 10. Between idler and driving sprockets 16 and 17, chains 15 are supported by respective guides 21 which may be adjustably mounted as by bolts 22 on frame 10. The drive for sprockets 17 and chains 15 is transmitted to gear 26 (Fig. 1) secured on shaft 19 through gear 27 suitably journalled on frame 10 from a suitable source of power. As pointed out hereinafter, chains 15 and buckets 14 are driven synchronously with the operation of measuring and transfer means 12.

Measuring and transfer element 12 includes a series of measuring pockets for successively receiving measured charges of material from hopper 13, such pockets being alternately enlarged and decreased in size for the purpose of effecting efficient transfer of material without injury thereto. For this purpose, means are provided for making the pockets of a smaller size to measure the charge and for subsequently increasing the size of the pocket as the pockets pass out of operative relation with the hopper. The above described means operate in conjunction with cutoff means including a cutoff chamber through which the pockets pass after leaving the hopper. Preferably, the cutoff means effects a preliminary cutoff operation which separates the charge from the bulk material in the hopper and a final cutoff operation after enlargement of a pocket to close the pocket and maintain the charge therein until the discharge position is reached. After leaving the discharge position, the size of each pocket is again decreased for its movement past the hopper.

Measuring and transfer element 12 (Figs. 1, 2 and 3) comprises cylindrical shell 31 and cylinder 32 mounted for rotation therein. Shell 31 (Fig. 1) is mounted by angle brackets 33 on frame 10 and has hopper 13 mounted thereon in registry with transverse opening 34 (Fig. 3) formed at one side of the highest part thereof. Shell 31 (Fig. 2) is open at one end to receive cylinder 32 and has its other end closed by end plate 36 suitably secured thereto and having cylindrical extension or bearing 37 on which cylinder 32 is journalled. Drive shaft 38 for cylinder 32 is journalled in bearing 37 and has one end secured within cylindrical end boss 39 of cylinder 32 as by set screw 40. At its opposite end, drive shaft 38 carries gear 41 which meshes with gear 27 (Fig. 1) so that cylinder 32 is rotated in the indicated direction and synchronously with the movement of buckets 14.

Cylinder 32 is provided with peripherally spaced longitudinal recesses 51 (Figs. 2 and 3) forming measuring pockets for transferring material from hopper 13 to discharge opening 52 formed adjacent the bottom of shell 31.

Figure 3:
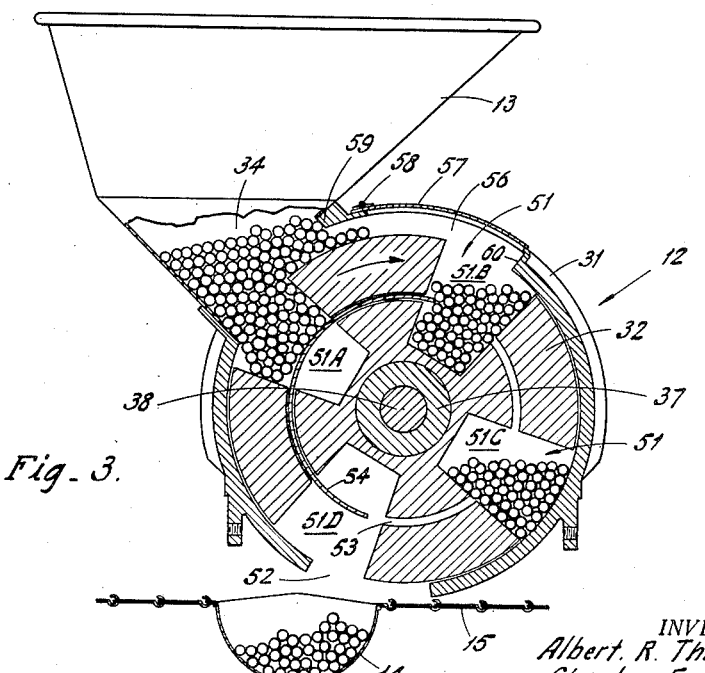
Fig. 3 is a fragmentary vertical longitudinal section through the machine taken in the plane of the line 3—3 in Fig. 2.

As stated above, the size or volume of pockets 51 is alternately enlarged and decreased, and for this purpose, cylinder 32 is provided with annular recess 53 extending entirely across measuring pockets 51 intermediate the depth thereof to receive semi-cylindrical shell 54 which is secured at one end between shell 31 and a shoulder of plate 36. As seen in Fig. 3, shell 54 cooperates with a measuring pocket 51 when in operative relation with hopper 13 to form a false bottom therein and reduce the size thereof. It will be noted that shell 54 may extend from adjacent discharge opening 52 to a position adjacent cutoff chamber 56 which will now be described.

Chamber 56 is formed at the top of shell 31 by a suitable recess therein adjacent feed opening 34 and closed by cover 57 suitably secured on shell 31 as by pivoting at 58. At one edge of feed opening 34, preliminary cutoff wall 59 is provided at the entrance side of cutoff chamber 56 and in spaced relation from cylinder 32 so that no crushing of the material can occur when a charge is separated from the material in hopper 13. At the exit side of chamber 56 final cutoff wall 60 is provided in closely spaced relation with respect to cylinder 32 to close a pocket after enlargement thereof and prevent the material from rolling out until the discharge opening is reached.

Figure 4:
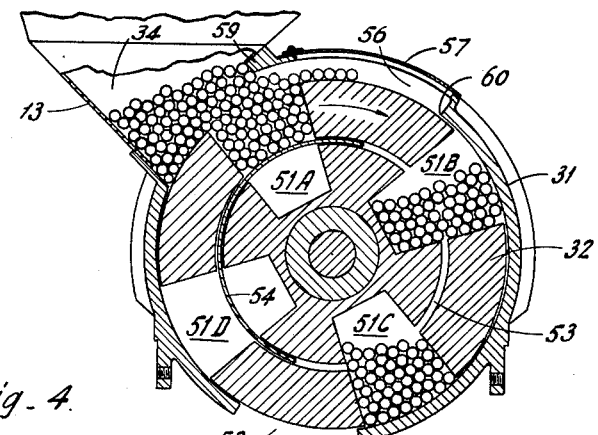
Figs. 4 and 5 are sectional views similar to Fig. 3 but illustrating different operative positions of the measuring and transfer element.
Figure 5:
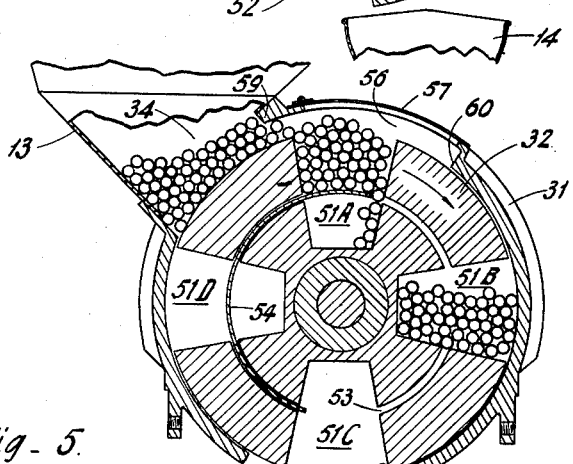

The operation of the device will now be described, and for convenience pockets 51 will be designated A, B, C and D, respectively. Pocket 51A is shown in Fig. 3 in operative relation with hopper 13, its lower portion being cut off by shell 54 so that a charge of granular material such as peas is received in the upper part thereof, such charge being measured as pocket 51A passes cutoff wall 59 as illustrated in Figs. 4 and 5. After passing cutoff wall 59 and before reaching cutoff wall 60 at the exit end of cutoff chamber 56, pocket 51A passes an end of shell 54 and becomes enlarged, the charge of peas dropping as illustrated in Figs. 5 and 3, with pockets 51A and 51B, respectively. As clearly seen in Fig. 3, before the trailing edge of pocket 51B passes cutoff wall 60 the entire charge is dropped below wall 60 by virtue of the enlargement of the pocket so that there is no possibility of any peas being caught or crushed. Subsequently, the charge of peas is conveyed by pocket 51 as closed by shell 31 to discharge opening 52 where the charge is dumped into a bucket 14 as illustrated by pocket 51C in Fig. 5. Fig. 3 illustrates a pocket 51D after complete discharge of the material conveyed thereby and before shell 54 again becomes effective to decrease the size thereof to receive another charge of peas from hopper 13.

Figure 6:
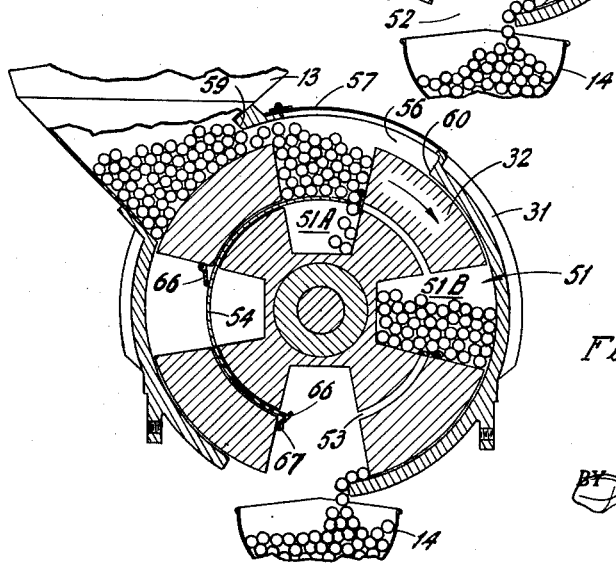
Fig. 6 is a view similar to Fig. 3 illustrating a modified form of the invention.

In the modified form of the invention shown in Fig. 6, means are provided for preventing the entry of small granular elements into annular recess 53, such means comprising a series of gates 66 pivoted at 67 in each measuring pocket 51 on the leading side thereof for closing recess 53. Gates 66 may operate by gravity or may be spring urged. As seen at the left of Fig. 6, gates 66 yield in passing shell 54, but are closed when a charge of material is contained by pockets 51 as illustrated in pockets 51A and 51B. Otherwise, the operation of the form shown in Fig. 6 is the same as described above.

Although for the purposes of this disclosure, the machine embodying our invention has been described as particularly suitable for handling peas, it will be understood that the invention is not confined thereto, since obviously it is susceptible to use with other materials of a granular nature.

Having now described our invention and in what manner the same may be used, what we claim as new and desire to protect by Letters Patent is:

1. In a measuring device for granular material, a casing, a measuring pocket mounted for movement in said casing, a hopper above the casing, a preliminary cutoff from the hopper to the pocket, means for increasing the volume of the pocket after passing the preliminary cutoff, and a second cutoff for closely confining the material in the pocket after the volume of the pocket has been increased.

2. In a measuring device for granular material, a casing, a series of measuring pockets mounted for movement in said casing, a hopper above the casing, a preliminary cutoff for separating charges for said pockets from material in said hopper, means for increasing the volume of a pocket after passing the preliminary cutoff, and a second cutoff for closely confining the material in a pocket after the volume of the pocket has been increased.

3. An apparatus for handling granular material comprising a hopper, a movable pocket for measuring and transferring a charge of material from said hopper, an element having relative movement with respect to said pocket to vary the size thereof while retaining the charge of material therein, the coaction of said pocket and said element being effective to provide a smaller size of said pocket during receipt of a charge thereby and to enable thereafter an enlargement of said pocket during bodily transfer of a charge of material by said pocket, and means for separating said pocket from said hopper after receipt of a charge without effecting closing of said pocket.

4. An apparatus for handling granular material comprising a hopper, rotary measuring and transfer means including a series of measuring pockets, means having relative movement with respect to said pockets to vary the size thereof, while retaining the charge of material therein said size varying means determining a smaller size of each pocket during receipt of a charge thereby, and means for separating said pocket from said hopper after receipt of a charge without effecting closing of said pocket.

5. An apparatus for handling granular material comprising a hopper, rotary measuring and transfer means including a series of measuring pockets, means for closing said pocket after receipt of a charge thereby, and means having relative movement with respect to said pockets to vary the size thereof, the coaction of said pockets and said size varying means determining a smaller size of each pocket when in cooperative relation with said hopper and determining a larger size of each pocket after receipt of a charge and before said closing means becomes operative.

6. In a machine for handling granular material, a casing having a feed opening adjacent the top and a discharge opening adjacent the bottom, a measuring pocket mounted for movement in said casing from said feed opening to said discharge opening, means for closing said pocket after movement thereof out of communication with said feed opening, and means for enlarging said pocket after receipt of a charge thereby and before said closing means becomes operative.

7. An apparatus for handling granular material, comprising a hopper, a series of measuring pockets mounted for rotation about a common axis and past said hopper to receive a charge, means for closing a pocket after movement thereof past said hopper, and means for enlarging said pocket beyond the size of said charge after said pocket has moved out of communication with said hopper and before said closing means becomes operative.

8. In a machine for handling granular material, a casing having a feed opening and a discharge opening, pocket forming means movable in said casing for receiving a charge of material through said feed opening and providing a constant pocket volume during receipt of the charge, a preliminary cutoff on said casing for determining the amount of said charge as the pocket moves past said hopper, a final cutoff on said casing for closing said pocket after movement thereof past said preliminary cutoff; and means for enlarging said pocket beyond the size of the charge during movement thereof from said preliminary cutoff to said final cutoff while retaining the charge of material therein.

9. In a machine for handling granular material, a cylindrical casing having a feed opening and a discharge opening, a hopper communicating with said feed opening, a cylinder mounted for rotation in said casing, a series of pockets in the periphery of said cylinder, a preliminary cutoff wall at one side of said feed opening and spaced from said cylinder, a final cutoff wall spaced peripherally around said casing from said preliminary cutoff wall for closing said pockets, said casing maintaining said pockets closed during material transferring movement thereof from said final cutoff wall to said discharge opening, and an element forming a false bottom for a pocket moving past said feed opening and said preliminary cutoff wall.

10. In a machine for handling granular material, a casing, a hopper communicating with said casing, an element movable in said casing having a pocket for receiving a charge of material from said hopper, a preliminary cutoff on said casing for determining the amount of said charge as said pocket moves past said hopper, a final cutoff on said casing for closing said pocket after movement thereof past said preliminary cutoff, and means for enlarging said pocket beyond the size of said charge during movement thereof from said preliminary cutoff to said final cutoff while retaining the charge of material therein.

11. In a machine for handling granular material, a casing, a hopper communicating with said casing, an element movable in said casing having a pocket for receiving a charge of material from said hopper, a preliminary cutoff on said casing for determining the amount of said charge as said pocket moves past said hopper, a final cutoff on said casing for closing said pocket after movement thereof past said preliminary cutoff, and an element positioned to form a false bottom for said pocket during communication thereof with said hopper.

12. In a machine for handling granular material, a cylindrical casing, a cylinder mounted for rotation in said casing having a measuring pocket therein and an annular recess extending across said pocket, and a cylindrical segment mounted on said casing and extending into said recess to form a false bottom for said pocket during a part of the travel thereof.

13. In a machine for handling granular material, a cylindrical casing, a cylinder mounted for rotation in said casing having a measuring pocket therein and an annular recess extending across said pocket, a cylindrical segment mounted on said casing and extending into said recess to form a false bottom for said pocket during a part of the travel thereof, and a gate movably mounted in said pocket on a wall thereof and normally operative to close said recess to prevent entry of material therein.

14. In a machine for handling granular material, a cylindrical casing, a cylinder mounted for rotation in said casing having a measuring pocket therein and an annular recess extending across said pocket, a cylindrical segment mounted on said casing and extending into said recess to form a false bottom for said pocket during a part of the travel thereof, and a gate movably mounted in said pocket on the leading wall thereof and normally operative to close said recess to prevent entry of material therein, said gate yielding upon engagement with said segment.

15. In a measuring device for granular material, a casing having a discharge opening adjacent the bottom thereof, measuring pocket means mounted for movement in said casing to receive and discharge material through the open end of the pocket, a hopper above the casing, a preliminary cutoff from the hopper to the pocket, means for increasing the volume of the pocket after passing the preliminary cutoff, and a second cutoff for closely confining the material in the pocket after the volume of the pocket has been increased, whereby said pocket retains the material therein until reaching said discharge opening.

16. An apparatus for handling granular material comprising a hopper, movable pocket means for measuring and transferring a charge of material from said hopper, said pocket means having a single opening for receiving and discharging material, means for varying the size of said pocket means while retaining a charge of material therein, the coaction of said pocket means and said size varying means being effective to provide a smaller size of said pocket means during receipt of a charge thereby and to enable thereafter an enlargement of said pocket means during transfer of a charge of material thereby, and means for separating said pocket means from said hopper after receipt of a charge without effecting closing of said pocket and before enlargement thereof.

ALBERT R. THOMPSON.
CHARLES E. KERR.